United States Patent
Walters

(10) Patent No.: US 9,434,326 B2
(45) Date of Patent: Sep. 6, 2016

(54) LICENSE PLATE MOUNTING DEVICE

(71) Applicant: David Walters, Caledonia, MI (US)

(72) Inventor: David Walters, Caledonia, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 0 days.

(21) Appl. No.: 14/733,203

(22) Filed: Jun. 8, 2015

(65) Prior Publication Data

US 2015/0353030 A1  Dec. 10, 2015

Related U.S. Application Data

(60) Provisional application No. 62/008,689, filed on Jun. 6, 2014.

(51) Int. Cl.
| | | |
|---|---|---|
| *F16M 13/00* | (2006.01) | |
| *B60R 13/10* | (2006.01) | |
| *F16F 1/373* | (2006.01) | |
| *F16F 15/08* | (2006.01) | |

(52) U.S. Cl.
CPC ........... *B60R 13/105* (2013.01); *F16F 1/3732* (2013.01); *F16F 15/08* (2013.01)

(58) Field of Classification Search
CPC ........ B60R 13/105; F16F 1/37; F16F 1/3732
USPC .................................................. 248/549, 636
See application file for complete search history.

(56) References Cited

U.S. PATENT DOCUMENTS

| | | | | |
|---|---|---|---|---|
| 3,053,046 A | * | 9/1962 | Fleming, Jr. | ........ F16B 19/1081 29/450 |
| 4,917,426 A | * | 4/1990 | Copp | .................... B60R 13/105 293/142 |
| 5,813,640 A | * | 9/1998 | Koch | ........................ G06F 7/18 248/222.11 |
| 6,167,645 B1 | * | 1/2001 | Gasko | ................... B60R 13/105 293/115 |
| 6,729,053 B2 | * | 5/2004 | Castro | ................... B60R 13/105 40/209 |
| 7,111,420 B2 | * | 9/2006 | Glickman | ............. B60R 13/105 248/222.11 |
| 8,136,854 B2 | * | 3/2012 | Rich | ..................... B60R 13/105 293/1 |
| 8,678,454 B2 | * | 3/2014 | Abe | ....................... B60R 19/50 293/115 |
| 9,199,593 B2 | * | 12/2015 | Fritsch | .................... B60R 19/44 |
| 2006/0156595 A1 | * | 7/2006 | Kasak | ................... B60R 13/105 40/209 |
| 2012/0013137 A1 | * | 1/2012 | Rinklin | .................. B60R 19/18 293/155 |

\* cited by examiner

*Primary Examiner* — Anita M King
(74) *Attorney, Agent, or Firm* — John S. Artz; Dickinson Wright PLLC

(57) ABSTRACT

A mount apparatus for securing a license plate to a vehicle. The mount apparatus includes a bracket that has a back side for facing the vehicle and a front side for being engaged by the license plate. At least one fastener extends through the bracket for connecting the bracket to the vehicle. At least one energy absorption device receives the fastener and engages and extends away from the back side of the bracket for spacing the bracket and the license plate from the vehicle to absorb energy transferred to the bracket during an impact with the license plate to dissipate the amount of energy transferred from the bracket to the vehicle during the impact.

23 Claims, 2 Drawing Sheets

LICENSE PLATE MOUNTING DEVICE

CROSS REFERENCE TO RELATED APPLICATIONS

This application claims the benefit of U.S. Provisional Patent Application Ser. No. 62/008,689 filed on Jun. 6, 2014 and titled "LICENSE PLATE MOUNTING DEVICE", the entire disclosure of which is hereby incorporated by reference.

TECHNICAL FIELD

The present disclosure relates generally to a license plate mounting device for a vehicle. More specifically, the present disclosure relates to a license plate mounting device for a vehicle that provides net neutral bumper system peak forces in the event of pedestrian impact.

BACKGROUND OF THE INVENTION

At present, thirty one states require the presence of license plates on the front of vehicle exteriors. It is expected that legislation may be passed in other states that will cause this number to increase significantly. Because this is a relatively recent event, little effort has gone into the design of these front license plates. As such, most current front license plate designs are relatively cheap, unattractive, and unstylized. Additionally, the design of existing front license plates can even detract from the appearance of other vehicle components that may have aesthetic benefits. For example, some current front license plate designs are relatively bulky and can cover up portions of a vehicle front grill, which itself can be stylized and thereby detract from its aesthetics. This obviously is undesirable.

Additionally, it is known that pedestrian leg loading targets can easily be exceeded during vehicle crash test evaluations when only existing content is evaluated, i.e., bumper beam, fascia, grille, etc. Undesirable spikes to leg loading forces will generally increase if an existing rigid license plate bracket is added to the test. This is not an acceptable condition from a safety standpoint.

One effort to address this safety concern caused by the potential additional forces that result from the inclusion of a front license plate is disclosed in U.S. Pat. No. 8,191,944. The '944 patent teaches an attachment mechanism for securing a front license plate to a front bumper of a motor vehicle. While the attachment mechanism allows for the dissipation of some energy in the event of pedestrian impact, all energy dissipation is managed entirely through the bumper system of the vehicle. Consequently, the license plate attachment is very rigid and does not allow for any flexibility between the license plate bracket and the vehicle front bumper. The performance of this system is entirely dependent upon the energy management system of the bumper to which the license plate mounting system is attached. If the bumper system to which this design is attached is close to peak loading, the design could actually add to peak loading, which obviously is undesirable.

It would thus be desirable to provide a front license plate mounting system that addresses these limitations.

SUMMARY OF THE INVENTION

It is therefore an aspect of the present disclosure to provide a license plate mounting device for a vehicle that provides net neutral bumper system peak forces in the event of pedestrian impact.

It is another aspect of the present disclosure to provide a license plate mounting device for a vehicle that is configured to release rearward by way of a grommet interface during a pedestrian impact.

It is still another aspect of the present disclosure to provide a license plate mounting device for a vehicle that is configured to maintain sufficient, pre-impact stability and security.

It is yet another aspect of the present disclosure to provide a license plate mounting device for a vehicle that provides improved aesthetics.

According to another aspect, a mount apparatus for securing a license plate to a vehicle is provided. The mount apparatus includes a bracket that has a back side for facing the vehicle and a front side for being engaged by the license plate. At least one fastener extends through the bracket for connecting the bracket to the vehicle. At least one energy absorption device receives the fastener and engages and extends away from the back side of the bracket for spacing the bracket and the license plate from the vehicle to absorb energy transferred to the bracket during an impact with the license plate to dissipate the amount of energy transferred from the bracket to the vehicle during the impact.

In accordance with the above and the other aspects, a license plate mounting device is provided, as shown and described.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE EXEMPLARY EMBODIMENTS

Figure 1:
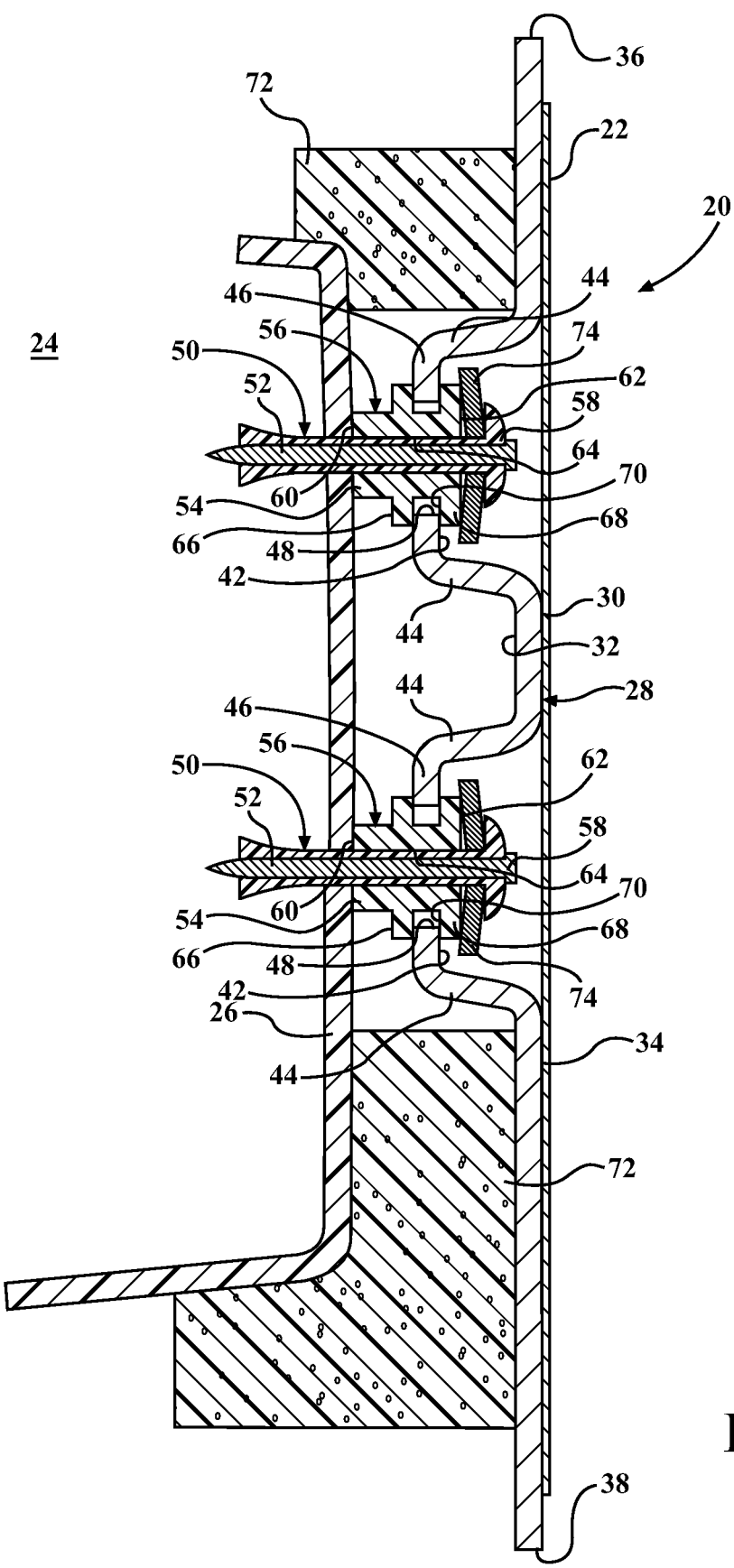
FIG. 1 is a schematic illustration of a mount apparatus according to an aspect of the disclosure.
Figure 2:
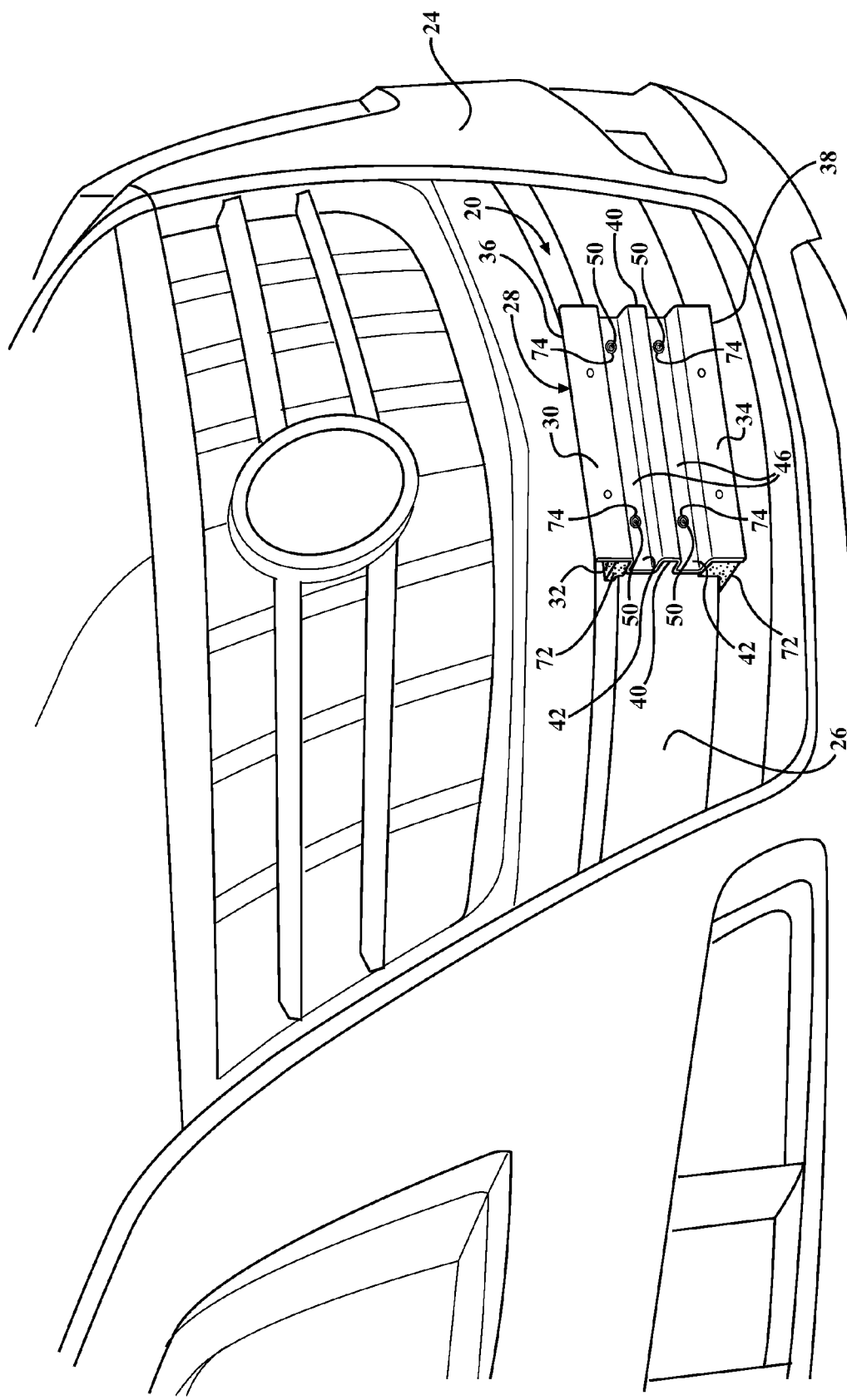
FIG. 2 is a perspective view of the mount apparatus of FIG. 1 without a license plate secured thereon in accordance with an aspect of the disclosure.

Referring to the Figures, wherein like numerals indicate corresponding parts throughout the several views, a mount apparatus 20 is generally shown for securing a license plate 22 to a vehicle 24. In the exemplary embodiment, the mount apparatus 20 is used for securing the license plate 22 to the front fascia or front bumper 26 of the vehicle 24, however, it should be appreciated that the mount apparatus 20 could secure the license plate 22 to any other area of the vehicle 24 as desired.

According to an aspect, the mount apparatus 20 includes a bracket 28 that has a front side 30 and a back side 32. The back side 32 may be connected to the front bumper 26 of the vehicle 24 and the front side 30 may support the license plate 22 on an engaging face 34. The engaging face 34 may be planar and may have a generally rectangular cross-section that includes a top edge 36, a bottom edge 38 and a pair of side edges 40 that extend between the top and bottom edges 36, 38. It should be appreciated that the engaging face 34 may have other cross-sectional shapes such as, but not limited to, an oval shape.

According to an aspect, the bracket 28 may be formed of a plastic material that is formed by way of an injection molding process. According to other aspects, the bracket 28 may be formed of other suitable materials using other forming techniques. According to another aspect, the bracket 28 may have a decorative metal finish thereon, such as may be applied by a conventional metal finishing process, including as is available from Lacks Industries, Inc. under the mark Chromtec®. Alternatively, the bracket 28 could have a SPINELLE® colored metal finish plated thereon, which is also available from Lacks Industries, Inc.

According to a further aspect, the bracket 28 may define a pair of indentations 42 that each have a generally u-shaped cross-section that extend between the side edges 40 of the engaging face 34, therefore dividing the engaging face 34 into three segments. It should be appreciated that any number of indentations 42 could be defined by the bracket 28. It should further be appreciated that the indentations 42 could extend along other lengths of the bracket 28. It will be appreciated that instead of indentations, a variety of other types of structures can be employed such as recessed pads. Each of the indentations 42 may include a pair of legs 44 and a connecting member 46. The pair of legs 44 may each extend from the back side 32 of the engaging face 34 in generally perpendicular relationship to the engaging face 34, and the connecting member 46 may extend between the pair of legs 44 in parallel relationship with the engaging face 34. It should be appreciated that the legs 44 and connecting member 46 could extend at other angles.

According to a further aspect, a plurality of orifices 48 may be defined by each of the connecting members 46 of the indentations 42. The orifices 48 may be defined in spaced relationship with one another. A fastener 50 may extend through each of the orifices 48 for connecting the bracket 28 to the front bumper 26 of the vehicle 24. It should be appreciated that any number of fasteners 50 may be employed, and the fasteners 50 may be conventional fasteners 50, such as rivets, screws, or bolts. Each fastener 50 may include a shank 52 that has a generally cylindrical shape that extends through an orifice 48, and a head 58 that has a generally disc shape that has a larger diameter than the shank 52.

According to another aspect, a plurality of energy absorption devices 56 may each be received by one of the orifices 48. The energy absorption devices 56 may be partially disposed in one of the orifices 48 of the bracket 28 and extend away from the back side 32 of the bracket 28 and receive the fastener 50 such that the energy absorption device 56 spaces the bracket 28 and the license plate 22 from the vehicle 24 to define a gap between the bracket 28 and the vehicle 24. Because the energy absorption devices 56 space the bracket 28 from the vehicle 24, the bracket 28 may move rearwardly toward the vehicle 24 during an impact with an object, such as a pedestrian, with the license plate 22. Such rearward movement allows the energy absorption device 56 to absorb energy transferred to the bracket 28, therefore dissipating the amount of energy transferred from the bracket 28 to the vehicle 24 during the impact.

According to a further aspect, each of the energy absorption devices 56 may be a grommet 56 that includes a body 54 that has a tube shape. It will be appreciated that the body 54 may have other shapes such as, but not limited to, a block shape. The body 54 may extend between a back end 60 for engaging the front bumper 26 of the vehicle 24, and a front end 62 that is spaced from the back end 60 for being spaced from the front bumper 26 and disposed in one of the indentations 42 of the bracket 28. According to a further aspect, each of the legs 44 of the indentations 42 may extend past the front end 62 of each of the grommets 56 to space the engaging face 34 of the bracket 28 from the grommets 56. Furthermore, the body 54 of each of the grommets 56 may define a passage 64 that extends between the front and back ends 62, 60. The passage 64 of each of the grommets 56 may receive the shank 52 of one of the fasteners 50 to secure the bracket 28 and the grommet 56 to the front bumper 26.

According to a further aspect, each of the grommets 56 may further include a first flange 66 that is moveably connected to the body 54 at a location that is spaced from the back end 60 of the body 54. The first flange engages and supports the back side 32 of the connecting member 46. Because the first flange 66 is movably connected to the body 54, it may elastically deform or break away/shear off from the body 54 during the impact with the license plate 22 to allow the bracket 28 to become disconnected from, e.g., stripped out of, the grommet 56, thereby dissipating the amount of energy transferred from the bracket 28 to the vehicle 24 during the impact. In other words, the amount of energy that gets translated to the front bumper 26/fascia energy management system may be dissipated during disconnection of the bracket 28 from the grommet 56.

According to another aspect, each of the grommets 56 may further include a second flange 68 that is moveably connected with the body 54 in spaced and parallel relationship with the first flange 66 to define a pocket 70 therebetween. Each pocket 70 may receive one of the connecting members 46 such that each second flange 68 is disposed in one of the indentations 42. The flanges 66, 68 may each have an annular shape and extend about the body 54. It should be appreciated, however, that the flanges 66, 68 could have other shapes such as, but not limited to, a square-shaped cross-section. The connecting member 46 may be radially spaced from the body 54 of the grommet 56 in the pocket 70 to provide space to make it easier for the bracket 56 to be released from the grommet 56.

According to another aspect, the flanges 66, 68 and/or entire grommet 56 may be made of a frangible material to provide for the moveable connection of the flanges 66, 68 to the body 54 of the grommet 56 for allowing the flanges 66, 68 to shear off of the body 54 during the impact to allow the bracket 28 to become disconnected from the grommet 56. According to yet another aspect, the flanges 66, 68 and/or entire grommet 56 may also be made of an elastomeric or compressible material for allowing the flanges 66, 68 of the grommet 56 to elastically deform relative to the body 54 during the impact to allow the bracket 28 to become disconnected from the grommet 56. Alternatively, instead of utilizing grommets or other separate deformable structures, the bracket could be formed with structures thereon, such as on the backside, that can deform in the event of an impact. Such structures can include ears or flanges that are capable of flexing or deforming upon impact. Other suitable structures may also be utilized. Such a configuration could eliminate the requirement for separate components.

According to a further aspect, a pair of dissipating masses 72 may each engage the back side 32 of the bracket 28 adjacent to one of the legs 44 of the indentations 42 for being disposed against the front bumper 26. The dissipating masses 72 may compress and absorb energy transferred to the bracket 28 during an impact with the license plate 22, therefore complimenting the energy absorption devices 56 in dissipating energy translated to the front bumper 26 during the impact. Said another way, the dissipating masses 72 can be utilized to assist the energy absorption devices 56 in dissipating energy created during an impact with a pedestrian. Further, the dissipating masses 72 may be made of an energy management foam material. It will be appreciated that the dissipating masses 72 can take on a variety of shapes and sizes. It will also be appreciated that any number of dissipating masses 72 can be utilized and they can be disposed in a variety of suitable locations.

According to yet another aspect, a captive washer 74 may be disposed about each of the fasteners 50 between the head 58 of the fastener 50 and the second flange 68 of the grommet 56. The head 58 may have a larger diameter than the orifice 48 of the bracket 28 for preventing the bracket 28 from becoming disconnected from the fastener 50 during disconnection of the grommet 56 from the fastener 50, thereby preventing the bracket 28 from become a projectile on the road and for making the bracket 28 more difficult to steal.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A mount apparatus for securing a license plate to a vehicle, comprising:
a bracket having a back side for facing the vehicle and a front side for being engaged by the license plate;
at least one fastener extending through said bracket for connecting said bracket to the vehicle, the at least one fastener oriented generally in line with a direction of travel of the vehicle; and
at least one energy absorption device configured to be disposed between the back side of the bracket and a forward surface of the vehicle, the at least one energy absorption device configured to receive said fastener and engage and extend away from said back side of said bracket to space said bracket and the license plate from the vehicle to absorb energy transferred to said bracket during an impact with the license plate to dissipate the amount of energy transferred from said bracket to the vehicle during the impact.

2. The mount apparatus as set forth in claim 1 wherein said energy absorption device is a grommet including a body extending between a back end for engaging the vehicle and a front end spaced from said back end for being spaced from the vehicle, and said grommet further includes a first flange moveably connected to said body at a location spaced from said back end of said body and in engagement with said back side of said bracket for allowing said flange to elastically deform or shear off from said body during the impact with the license plate to allow said bracket to become disconnected from said grommet to dissipate the amount of energy transferred from said bracket to the vehicle during the impact.

3. The mount apparatus as set forth in claim 2 further comprising: a plurality of grommets spaced apart from one another.

4. The mount apparatus as set forth in claim 2 wherein said grommet further includes a second flange moveably connected to said body in spaced and parallel relationship with said first flange to define a pocket therebetween with said pocket receiving said bracket.

5. The mount apparatus as set forth in claim 4 wherein said bracket is radially spaced from said body of said grommet in said pocket.

6. The mount apparatus as set forth in claim 4 wherein each of said flanges have an annular shape and extend about said body of said grommet.

7. The mount apparatus as set forth in claim 2 wherein said fastener extends through said body between said front and back ends.

8. The mount apparatus as set forth in claim 2 wherein said first flange of said grommet is made of a frangible material for allowing said first flange to shear off of said body during the impact to allow said bracket to become disconnected from said grommet.

9. The mount apparatus as set forth in claim 2 wherein said first flange of said grommet is made of an elastomeric material for allowing said flange to elastically deform relative to said body during the impact to allow said bracket to become disconnected from said grommet.

10. The mount apparatus as set forth in claim 2 wherein bracket defines an orifice receiving said fastener, said fastener includes a shank and a head with said shank extending through said orifice and said body of said grommet, a captive washer is disposed about said fastener between said head of said fastener and said bracket for preventing said bracket from becoming disconnected from said fastener during disconnection of said grommet from said fastener during the impact.

11. The mount apparatus as set forth in claim 10 wherein said captive washer has a larger diameter than said orifice of said bracket to prevent said bracket from sliding off of said fastener.

12. The mount apparatus as set forth in claim 2 wherein said bracket includes an engaging face being planar for being engaged by and connected to the license plate, said bracket further defines at least one indentation including a pair of legs and a connecting member with said pair of legs extending from said back side of said engaging face and said connecting member extending between said pair of legs.

13. The mount apparatus as set forth in claim 12 wherein said grommet engages and extends away from said connecting member of said indentation.

14. The mount apparatus as set forth in claim 13 wherein each of said legs of said indentation extend past said front end of said grommet to space said engaging face from said grommet.

15. The mount apparatus as set forth in claim 14 wherein said indentation has a generally U-shaped cross-section with said legs of said indentation extending perpendicularly to said engaging face and said connecting member extends in parallel relationship with said engaging face.

16. The mount apparatus as set forth in claim 15 wherein said engaging face has a generally rectangular shaped cross-section including a top edge and a bottom edge and a pair of side edges extending between said top and bottom edges, said indentation extends between said side edges of said engaging face.

17. The mount apparatus as set forth in claim 1 further including at least one dissipating mass engaging said back side of said bracket for being disposed against the vehicle for compressing and further absorbing energy transferred to said bracket during the impact with the license plate to further dissipate energy translated to the front bumper during the impact.

18. The mount apparatus as set forth in claim 17 wherein said dissipating mass is made of a foam material.

19. The mount apparatus as set forth in claim 17 wherein said dissipating mass is disposed adjacent to said energy absorbing device.

20. The mount apparatus as set forth in claim 1 further including a metal finish disposed on said bracket.

21. A license plate mounting system for a vehicle, comprising:
   a generally planer mounting bracket having a front portion for facing generally in a direction of vehicle travel and a back portion opposing the front portion, the mounting bracket configured to receive and retain a license plate;
   the mounting bracket including a plurality of openings formed in the front portion for receiving a fastener therethrough to connect the mounting bracket to a vehicle front end;
   an energy absorption device configured to be located behind each of the plurality of openings, the energy absorption device including a front surface for engaging the back portion of the mounting bracket and a back surface for engaging the front surface of the vehicle;
   the energy absorption device including a passageway therethrough for receipt of the fastener, the energy absorption device configured to space the mounting bracket away from the vehicle front surface such that energy resulting from an impact with the bracket can dissipate prior to being applied to the vehicle front end.

22. The system of claim 21, wherein the bracket if formed from a plastic material.

23. The system of claim 22, wherein the bracket includes a metal plated coating disposed on at least a portion of the front portion.

* * * * *